United States Patent
Keim et al.

(10) Patent No.: US 7,260,462 B2
(45) Date of Patent: Aug. 21, 2007

(54) METHOD FOR CONTROLLING AN ELECTROMAGNETIC VALVE, IN PARTICULAR FOR AN AUTOMATIC TRANSMISSION OF A MOTOR VEHICLE

(75) Inventors: Norbert Keim, Loechgau (DE); Christof Ott, Asperg (DE); Wulf-Siegfried Bayha, Stuttgart (DE); Martin Krohn, Weinstadt (DE); Bernd Huber, Schorndorf (DE); Jens Dorfschmid, Frickenhausen (DE); Juergen Semler, Alfdorf (DE)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 10/773,668

(22) Filed: Feb. 6, 2004

(65) Prior Publication Data

US 2004/0225429 A1    Nov. 11, 2004

(30) Foreign Application Priority Data

Feb. 6, 2003    (DE)    ................................. 103 04 711

(51) Int. Cl.
*B05B 1/30* (2006.01)
*F02M 51/00* (2006.01)
*F15B 13/04* (2006.01)
*G05D 16/20* (2006.01)
*F16D 48/06* (2006.01)

(52) U.S. Cl. .................. 701/51; 239/585.2; 239/585.1; 239/585.5; 91/459; 137/625

(58) Field of Classification Search ............. 239/585.1, 239/88, 533.3, 483, 585.2, 585.5; 251/129; 701/1, 51; 137/625
See application file for complete search history.

(56) References Cited

U.S. PATENT DOCUMENTS 3,731,881 A * 5/1973 Dixon et al. ............. 239/585.3

(Continued)

FOREIGN PATENT DOCUMENTS

DE    33 20 110    12/1984

(Continued)

OTHER PUBLICATIONS

He-An, Yang Xiang-dong et al., Line mass-density measurements of gas puff Z-pinch load using high sensitivelaser interferometer, Journal of High Power Laser and Particle Beams, published in Jun. 2006, vol. 18, No. 6, p. 1049-52, by Nucl. Soc. China, China.*

(Continued)

*Primary Examiner*—Cuong Nguyen
(74) *Attorney, Agent, or Firm*—Kenyon & Kenyon LLP

(57) ABSTRACT

A method for controlling an electromagnetic valve, in particular for an automatic transmission of a motor vehicle. With known methods, electromagnetic valves are triggered with a pulse-width-modulated signal having a constant clock frequency. The object is to provide a method by which a rapid response characteristic and a high adjustment precision of the electromagnetic valve are made possible. The specific properties of a hydraulic system in which electromagnetic valves are used, in particular the rigidity and damping, are not constant but instead change considerably under different operating states of the hydraulic system and/or with different performance quantities of the electromagnetic valve. These different properties are taken into account through the change in the clock frequency as a function of performance quantities of the electromagnetic valve. The clock frequency may thus be optimally adapted to the properties of the hydraulic system, and a rapid response characteristic and a high adjustment precision are achieved.

11 Claims, 2 Drawing Sheets

U.S. PATENT DOCUMENTS

| | | | | |
|---|---|---|---|---|
| 3,909,601 | A * | 9/1975 | Yamawaki et al. | 700/70 |
| 4,121,547 | A * | 10/1978 | Asano | 123/687 |
| 4,232,830 | A * | 11/1980 | Casey et al. | 239/585.5 |
| 4,279,230 | A * | 7/1981 | Bauer et al. | 123/680 |
| 4,282,842 | A * | 8/1981 | Sasayama | 123/684 |
| 4,331,317 | A * | 5/1982 | Kamai et al. | 251/129.21 |
| 4,350,970 | A | 9/1982 | von Tomkewitsch | |
| 4,384,681 | A * | 5/1983 | Claxton | 239/585.5 |
| 4,543,875 | A * | 10/1985 | Imhof | 91/459 |
| 4,603,550 | A * | 8/1986 | Shinzawa | 60/274 |
| 4,962,648 | A * | 10/1990 | Takizawa et al. | 62/199 |
| 4,967,550 | A * | 11/1990 | Acton et al. | 60/794 |
| 5,005,353 | A * | 4/1991 | Acton et al. | 60/39.281 |
| 5,082,421 | A * | 1/1992 | Acton et al. | 415/118 |
| 5,117,795 | A * | 6/1992 | Ohsuga et al. | 123/478 |
| 5,141,391 | A * | 8/1992 | Acton et al. | 415/119 |
| 5,271,565 | A * | 12/1993 | Cerny | 239/533.8 |
| 5,289,183 | A | 2/1994 | Hasset et al. | |
| 5,404,301 | A * | 4/1995 | Slicker | 701/60 |
| 5,787,132 | A * | 7/1998 | Kishigami et al. | 375/354 |
| 5,884,850 | A * | 3/1999 | Norgauer | 239/585.5 |
| 6,209,522 | B1 * | 4/2001 | Onishi et al. | 123/458 |
| 6,294,905 | B1 * | 9/2001 | Schwartz | 323/288 |
| 6,373,972 | B1 * | 4/2002 | Nonomura | 382/133 |
| 6,374,856 | B1 * | 4/2002 | Nitsche | 137/625.65 |
| 6,422,203 | B1 * | 7/2002 | Djordjevic | 123/456 |
| 6,619,613 | B1 * | 9/2003 | Akamatsu et al. | 251/129.04 |
| 6,662,642 | B2 * | 12/2003 | Breed et al. | 73/146 |
| 6,732,217 | B1 * | 5/2004 | Nishikido | 710/306 |
| 6,738,697 | B2 * | 5/2004 | Breed | 701/29 |
| 6,758,089 | B2 * | 7/2004 | Breed et al. | 73/146 |
| 6,792,916 | B2 * | 9/2004 | Oashi | 123/446 |
| 6,850,824 | B2 * | 2/2005 | Breed | 701/36 |
| 7,050,897 | B2 * | 5/2006 | Breed et al. | 701/46 |
| 7,126,689 | B2 * | 10/2006 | Nishi | 356/400 |
| 7,164,117 | B2 * | 1/2007 | Breed et al. | 250/221 |
| 2001/0028456 | A1 * | 10/2001 | Nishi | 356/400 |
| 2002/0121132 | A1 * | 9/2002 | Breed et al. | 73/146 |
| 2003/0005759 | A1 * | 1/2003 | Breed et al. | 73/146 |
| 2003/0009270 | A1 * | 1/2003 | Breed | 701/29 |
| 2003/0132939 | A1 * | 7/2003 | Moshe et al. | 345/474 |
| 2003/0187571 | A1 | 10/2003 | Impson et al. | |
| 2003/0220736 | A1 * | 11/2003 | Kawasaki | 701/211 |
| 2003/0234859 | A1 * | 12/2003 | Malzbender et al. | 348/14.05 |
| 2004/0039509 | A1 * | 2/2004 | Breed | 701/45 |
| 2004/0215382 | A1 * | 10/2004 | Breed et al. | 701/45 |
| 2004/0225429 | A1 * | 11/2004 | Keim et al. | 701/51 |
| 2004/0267443 | A1 * | 12/2004 | Wantanabe | 701/201 |
| 2005/0046584 | A1 * | 3/2005 | Breed | 340/825.72 |
| 2006/0208169 | A1 * | 9/2006 | Breed et al. | 250/221 |

FOREIGN PATENT DOCUMENTS

| | | | |
|---|---|---|---|
| DE | 3245259 | C * | 1/1987 |
| DE | 42 31 799 | | 3/1994 |
| DE | 694 00 844 | | 5/1997 |
| DE | 298 09 412 | | 10/1998 |
| DE | 199 20 307 | | 11/2000 |
| DE | 199 63 153 | | 7/2001 |
| DE | 101 14 374 | | 6/2002 |
| DE | 10304711 | A1 * | 8/2004 |
| EP | 0 628 742 | | 12/1994 |
| EP | 628742 | B1 * | 11/1996 |
| EP | 904495 | B1 * | 6/2003 |
| JP | 3600936 | B2 * | 12/2004 |
| JP | 2005114157 | A * | 4/2005 |
| KR | 300295 | B * | 11/2001 |

OTHER PUBLICATIONS

Hu Hanping et al., Pulse electromagnetic light valve based on adaptive fuzzy control, Journal of Applied Science, published in Dec. 1999, vol. 17, No. 4, p. 463-8; by Editorial Committee of J. Applied Science, China.*

Venkataramani N. et al., Springless fast opening electromagnetic valve, Indian Journal of Pure and Applied Physics, published in Jan. 1981, vol. 19, No. 1, p. 56-60, India.*

Scherbakov V S., Controlling electromagnetic compressor valve, patent number GB-1415444, UK publication year 1976.*

English language translation of claim 1 of DE 33 20 110, filed Mar. 27, 2007.

English language translation of Abstract of DE 298 09 412, filed Mar. 27, 2007.

* cited by examiner

METHOD FOR CONTROLLING AN ELECTROMAGNETIC VALVE, IN PARTICULAR FOR AN AUTOMATIC TRANSMISSION OF A MOTOR VEHICLE

FIELD OF THE INVENTION

The present invention relates to a method for controlling an electromagnetic valve, in particular for an automatic transmission of a motor vehicle.

BACKGROUND INFORMATION

German Published Patent Application No. 298 09 412 describes a method for controlling an electromagnetic valve in the form of a pressure regulating valve designed in the manner of a seat valve driven by an electromagnet. This method is executed by a control device in the form of an electronic device which triggers the electromagnetic valve with a pulse-width-modulated trigger signal in the form of a pulse signal. A clock frequency of the trigger signal is constant in all operating ranges of the electromagnetic valve.

SUMMARY OF THE INVENTION

An object of the present invention is to provide a method for controlling an electromagnetic valve by which a rapid response characteristic and a high adjustment precision of the electromagnetic valve are made possible.

According to the present invention, the clock frequency of the trigger signal is altered by the control device as a function of performance quantities of the electromagnetic valve. In conjunction with the present invention, the performance quantities of the electromagnetic valve are also understood to include performance quantities of the unit and the hydraulic system in which the electromagnetic valve is used, e.g., an automatic transmission or the working medium, e.g., transmission oil. Performance quantities may also include, for example, the type and size of the trigger signal, the temperature of the working medium, the level of the power supply voltage or operating states of a load, e.g., a clutch.

In the case of pulse-width-modulated triggering, a setpoint value is set on an electromagnetic valve, e.g., a setpoint current, by varying a ratio between an on-time and an off-time of the power supply voltage. In the triggering method according to the related art, the sum of the on-time and the off-time, which is known as the period, is constant. The period may amount to 1 ms, for example, so the clock frequency is 1000 Hz. Due to this triggering, an armature of the electromagnetic valve executes micromotions, so that in a change of position only sliding friction and no considerably higher adhesive friction need be overcome.

The specific properties of a hydraulic system in which electromagnetic valves are used, in particular the rigidity and damping, are not constant but instead change considerably under different operating states of the hydraulic system and/or with different performance quantities of the electromagnetic valve. These different properties are taken into account through a change in the clock frequency as a function of performance quantities of the electromagnetic valve. The clock frequency may thus be optimally adapted to the properties of the hydraulic system, and a rapid response characteristic and a high adjustment precision are achieved. The hysteresis of the electromagnetic valve is thus very low.

Hydraulic systems sometimes have a very great tendency toward compressive oscillations. The triggering and thus the responses induced in an electromagnetic valve constitute energization of the hydraulic system. They also have an influence on resonant frequencies of the hydraulic system. These excitations may result in pressure fluctuations. The clock frequency in pulse-width-modulated triggering is a decisive property of the triggering. By adapting the clock frequency and thus the triggering to the specific properties, in particular the rigidity and damping, it is possible to avoid compressive oscillations in the hydraulic system.

In the embodiment of the present invention, the clock frequency depends on a setpoint and/or actual valve current through the coil. A certain setpoint valve current through the armature is to be set with the pulse-width-modulated triggering. The ratio between the on-times and the off-times of the power supply voltage is adjusted so as to yield the setpoint valve current. The resulting actual valve current is measurable.

The pulse-width-modulated triggering results in an actual current in the coil which fluctuates in a sawtooth pattern about the arithmetic mean. The sawtooth curve has a PT1 characteristic due to the inductance of the coil. The form of the actual current depends on the level of the setpoint current or the actual current. By adjusting the clock frequency to the setpoint current and/or the actual current, it is possible to adapt the form and thus also the excitation of the hydraulic system to the properties of the hydraulic system.

The electromagnetic valve may be designed as a seat valve which has a transfer cross section for influencing the pressure and/or flow conditions. The transfer cross section is variable via an armature which is movable by the coil. In such a design of the electromagnetic valve, the clock frequency increases when the armature is near the valve seat, which together with the armature determines the transfer cross section.

The pulse-width-modulated triggering results in micromotions of the armature, the greater the amplitude of the micromotions, the lower the clock frequency. If the armature is near the valve seat, this may result in the armature striking the valve seat, which is known as seat chatter. This causes unwanted noise and also constitutes an additional energization of the hydraulic system. The amplitude of the micromotions is reduced and their frequency is increased by a high clock frequency. The clock frequency may be increased, for example, to 1.5 times the normal clock frequency, i.e., to 1500 Hz, for example. This makes it possible to effectively prevent seat chatter.

In an embodiment of the present invention, the clock frequency depends on a temperature of the working medium of the electromagnetic valve. When the electromagnetic valve is used in an automatic transmission, the working medium is transmission oil. The temperature of the working medium may be measured or calculated, i.e., estimated, on the basis of other parameters. However, the electromagnetic valve may also be operated with other liquids or gases.

Damping of a hydraulic system depends greatly on the temperature of the working medium, i.e., the hydraulic fluid used. When using hydraulic oil, e.g., transmission oil, the damping decreases with an increase in temperature due to the change in the viscosity of the hydraulic oil. The dynamic characteristics of the oscillating system formed with the hydraulic system are thus variable, which results in a variable transmission performance of the system. The clock frequency may be optimally adapted to the instantaneous damping of the hydraulic system by varying the clock frequency as a function of the temperature of the working medium. In particular, the clock frequency becomes higher with an increase in temperature. The risk of pressure fluctuations in the hydraulic system is thus very low.

At low temperatures of the working medium, an electromagnetic valve may have a larger hysteresis in comparison with higher temperatures, but the risk of compressive oscillations is not so high due to the higher damping. Hysteresis may be minimized by a larger amplitude of the micromotions of the armature without thereby stimulating compressive oscillations. It is thus advantageous to set a lower clock frequency of the trigger signal at low temperatures of the working medium.

In the embodiment of the present invention, the clock frequency depends on the level of a power supply voltage of the electromagnetic valve. In particular, the clock frequency increases with an increase in on-board voltage. The electromagnetic valve is acted upon by the power supply voltage during the on-time mentioned above. When using the electromagnetic valve in a motor vehicle, the power supply voltage usually corresponds to the on-board voltage of the vehicle. This may vary greatly as a function of the charge of the vehicle battery, the condition of the generator or the requirements of other loads, for example. In passenger vehicles today, the power supply voltage may vary between about 9 V and 16 V.

In addition to the setpoint current, the power supply voltage has a significant influence on the actual current characteristic. By taking into account the power supply voltage, the clock frequency may be optimally adapted to the properties of the hydraulic circuit.

In individual cases, a reduction in the triggering frequency with an increase in voltage may also be advantageous.

In an embodiment of the present invention, a load terminal of the electromagnetic valve is in an operative connection to a load. The load may be designed, for example, as the clutch of an automatic transmission or as a bridging clutch of a hydrodynamic torque converter. Another component, e.g., a control slide valve or a regulating valve, may be situated between the electromagnetic valve and the load. The clock frequency depends here on the operating state of the load. For example, the operating state of a clutch is understood to refer to whether the clutch is in a filling phase, a shifting phase, a slipping phase, or a torque transmitting phase.

The properties, in particular the rigidity, of the hydraulic system depend greatly on the operating state of the load. The clock frequency may be optimally adapted to the properties of the hydraulic system by varying the clock frequency as a function of the operating state of the load.

In an embodiment of the present invention, a heterodyne signal having a smaller heterodyne frequency in comparison with the clock frequency of the pulse-width-modulated triggering is superimposed on the trigger signal. The heterodyne frequency amounts to between 40 Hz and 80 Hz, for example. With a setting of a setpoint valve current, the heterodyne signal is thus superimposed on the setpoint valve current. The heterodyne signal may be designed, for example, to be sinusoidal or square wave. The amplitude of the heterodyne signal is considerably smaller than the power supply voltage; for example, the amplitude amounts to between 1/10 and 1/50 of the power supply voltage. The hysteresis of the electromagnetic valve is thus particularly low.

In an embodiment of the present invention, the heterodyne frequency and/or amplitude of the heterodyne signal is/are altered by the control device as a function of performance quantities of the electromagnetic valve. The same relationships are taken into account here as in the change in the clock frequency of the pulse-width-modulated triggering. The prompting and the advantages of the changes in the heterodyne frequency and/or the amplitude likewise correspond to those of the change in the clock frequency.

For example, the heterodyne frequency may be increased with an increase in the temperature of the working medium.

DETAILED DESCRIPTION

Figure 1:
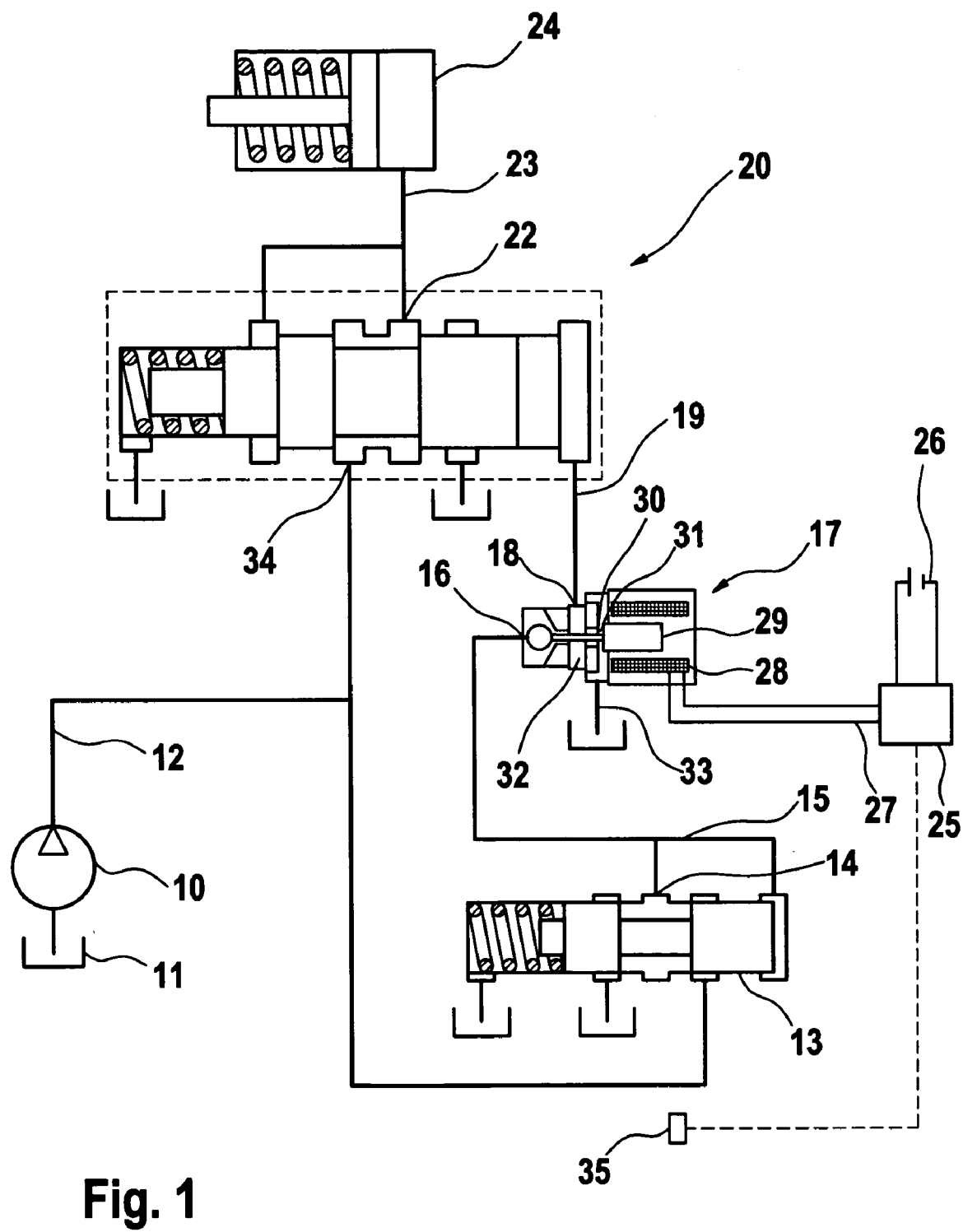
FIG. 1 shows a detail of a hydraulic control of an automatic transmission having an electromagnetic valve.

According to FIG. 1, a hydraulic control of an automatic transmission for a motor vehicle has a pump 10, which is driven by a drive motor (not shown). Pump 10 delivers a working medium in the form of transmission oil from a tank 11 into a working pressure line 12 and thus generates a working pressure for the hydraulic control in working pressure line 12.

Working pressure line 12 is connected to a constant pressure valve 13. Constant pressure valve 13 generates a constant pressure of 5 bar, for example, at its output 14 and thus in supply pressure line 15. Supply pressure line 15 is connected to a supply connection 16 of an electromagnetic valve 17.

Electromagnetic valve 17 is triggered by a control device 25 having a pulse-width-modulated trigger signal. Control device 17 establishes a setpoint valve current through a coil 28 of electromagnetic valve 17, with a setpoint valve current corresponding to a setpoint pressure at a load connection 18 of electromagnetic valve 17. Control device 25 is supplied with power from an on-board voltage network 26, which is represented symbolically here. Control device 25 is also in signal connection with a temperature sensor 35 by which the temperature of the working medium is detected.

Control device 25 is connected by a triggering line 27 to a coil 28 of electromagnetic valve 17. An armature 29 of electromagnetic valve 17 is movable by a magnetic field generated in coil 28. Between armature 29 and a valve seat 30, a transfer cross section 31 leads from a pressure space 32, which is connected to power supply connection 16, to a tank drain 33. Transfer cross section 31 may be altered by movement of armature 29, thereby adjusting the setpoint pressure in pressure space 32 and therefore adjusting the pressure at load terminal 18.

Load terminal 18 is connected via a control pressure line 19 to a regulating valve 20, where the setpoint pressure of electromagnetic valve 17 provides the control pressure for regulating valve 20. The control pressure may be at most as high as the pressure in supply pressure line 15. Regulating valve 20 is also connected via a working pressure connection 34 to working pressure line 12.

Regulating valve 20 increases the control pressure, so that an increased control pressure is available at an outlet 22 of regulating slide valve 20, which is connected by an output pressure line 23 to an actuator cylinder 24 of a clutch (not shown) of the automatic transmission. By triggering electromagnetic valve 17 and boosting the control pressure by regulating valve 20, it is possible to open and close the clutch of control device 25 of the automatic transmission. The clutch has various operating states during operation of the automatic transmission.

The electromagnetic valve may also be designed as a flow regulating valve.

The automatic transmission may be designed, for example, as a planetary transmission, a continuous variable transmission (CVT), or an automated manual transmission (AMT).

Figure 2A:
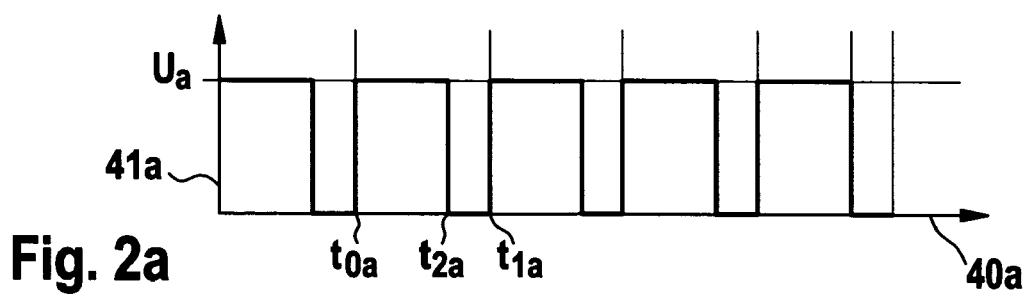
FIG. 2a shows a first diagram of the plot of a trigger signal of the electromagnetic valve as a function of time.
Figure 2B:
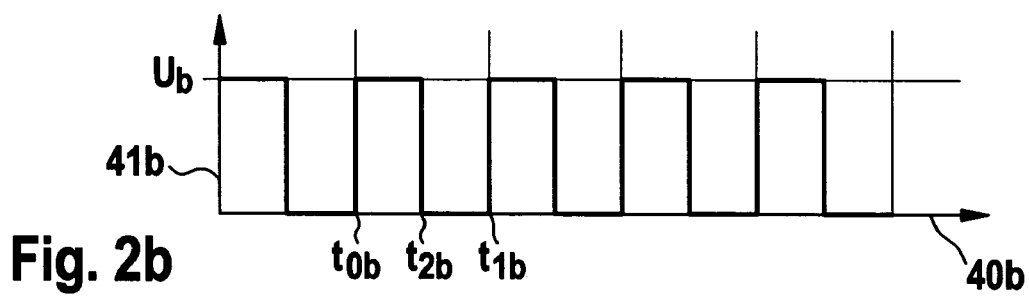
FIG. 2b shows a second diagram of the plot of the trigger signal of the electromagnetic valve as a function of time.

FIGS. 2a, 2b, 2c, and 2d show a pulse-width-modulated trigger signal of electromagnetic valve 17 from FIG. 1 plotted over time. Time is plotted on abscissas 40a, 40b, 40c and 40d, and the trigger signal is plotted on ordinates 41a, 41b, 41c, and 41d in the form of a voltage applied to coil 28. The clock frequencies of the signals in FIGS. 2a and 2b are identical.

In FIG. 2a, the period of time between points in time $t_{0a}$ and $t_{1a}$ corresponds to the period of the trigger signal. During this period of time, the signal passes through a complete cycle of on-time and off-time. The period amounts to 1 ms, for example, so the clock frequency is 1000 Hz.

During the on-time, coil 28 is acted upon by control device 25 with power supply voltage $U_a$. No voltage is applied to coil 28 during the off-time. Power supply voltage $U_a$ may fluctuate during operation of the vehicle. The on-time here corresponds to the period of time between points in time $t_{0a}$ and $t_{2a}$. By varying the period of time, i.e., by shifting the point in time $t_{2a}$ it is possible to alter the current through coil 28 and thus the position of armature 29. In FIG. 2a the on-time corresponds to approx. 70% of the period, so the setpoint and actual valve current amounts to approximately 70% of the maximum current.

Figure 3:
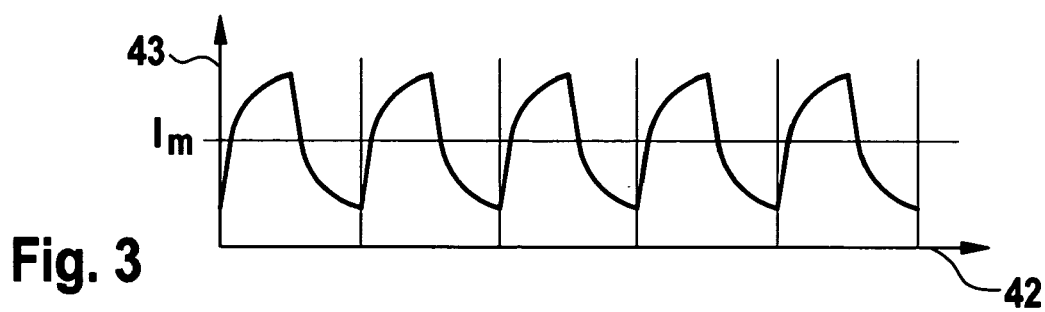
FIG. 3 shows a diagram of a plot of the actual valve current over time.

In the case of the trigger signal in FIG. 2b, the on-time has been reduced to 50%. The period of time between the points in time $t_{0b}$ and $t_{2b}$ corresponds to exactly 50% of the period of time between points in time $t_{0b}$ and $t_{1b}$. FIG. 3 shows qualitatively the actual valve current through coil 28 resulting from the trigger signal. The actual valve current fluctuates in a sawtooth pattern about its arithmetic mean $I_m$. During the on-phase of the trigger signal, the actual valve current rises to more than $I_m$ but then drops below $I_m$ in the off-phase. This rise and fall yields a PT1 characteristic which is due to the inductance of coil 28. The period and thus the clock frequency of the actual valve current are identical to the period and clock frequency of the trigger signal in FIG. 2b.

Figure 2C:
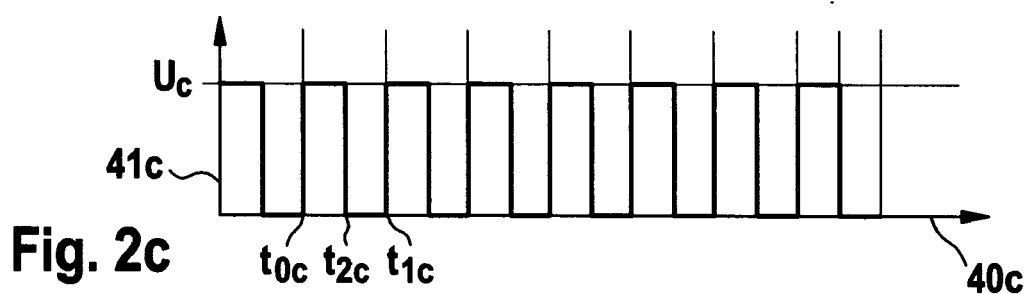
FIG. 2c shows a third diagram of the plot of the trigger signal of the electromagnetic valve as a function of time.

In comparison with the signals in FIGS. 2a and 2b, the trigger signal in FIG. 2c has a higher clock frequency, e.g., 1600 Hz. This is achieved by shifting the point in time $t_{1c}$ in the direction of the point in time $t_{0c}$ and thus shortening the length of the period. Since the on-time ($t_{0c}$–$t_{2c}$) corresponds to 50% of the period, as is the case with the signal in FIG. 2b, the setpoint valve current is just as large as the trigger signal in FIG. 2b.

However, the curve of the actual valve current (not shown) changes. The frequency of the sawtooth curve becomes larger and the amplitude becomes smaller. Differences between the unchanged arithmetic mean of the actual valve current and a maximum and/or minimum value of the actual valve current become smaller. The amplitude of the micromotions of the armature thus also becomes smaller and the frequency becomes higher. A higher clock frequency in comparison with normal operation is established at high temperatures of the working medium or when armature 29 is situated near valve seat 30.

Figure 2D:
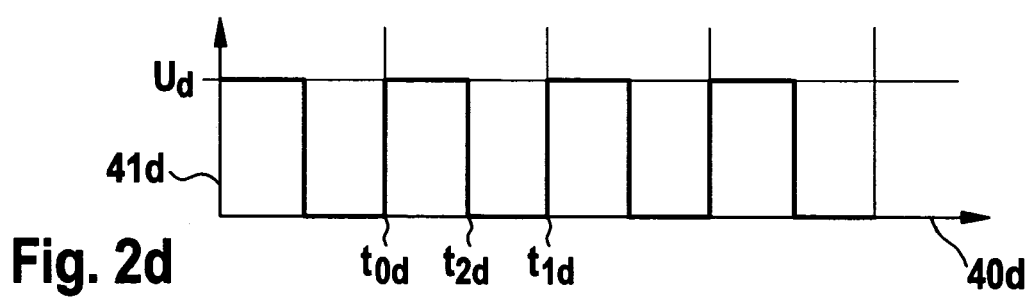
FIG. 2d shows a fourth diagram of the plot of the trigger signal of the electromagnetic valve as a function of time.

The trigger signal in FIG. 2d has a lower clock frequency, e.g., 500 Hz, than the signals in FIGS. 2a and 2b. This is achieved by shifting the point in time $t_{1d}$ away from the point in time $t_{0d}$ and thus increasing the length of the period. Since the on-time ($t_{0d}$–$t_{2d}$) corresponds to 50% of the period, as is the case with the signal in FIG. 2b, the setpoint valve current is just as large as the trigger signal in FIG. 2b.

The curve of the actual valve current changes. The frequency of the sawtooth curve becomes smaller and the amplitude becomes larger. The amplitude of the micromotions of the armature thus also becomes larger and the frequency becomes lower. A lower clock frequency in comparison with normal operation is established at low temperatures of the working medium.

What is claimed is:

1. A method for controlling an electromagnetic valve, comprising:
    triggering a coil of the electromagnetic valve by a control device with a pulse-width-modulated trigger signal; and
    altering a clock frequency of the trigger signal by the control device as a function of a performance quantity of the electromagnetic valve, the clock frequency being a function of at least one of a setpoint valve current through the coil and an actual valve current through the coil, wherein:
    an armature of the electromagnetic valve is movable on the basis of a force generated by the coil, wherein:
    an indicated force and thus a position of the armature is a function of at least one of the setpoint valve current and the actual valve current,
    the electromagnetic valve has a transfer cross section for influencing at least one of a pressure condition of a working medium and a flow condition of the working medium,
    the transfer cross section is variable via the armature,
    the setpoint valve current includes a first setpoint valve current and a second setpoint valve current,
    the clock frequency at at least one of the first setpoint valve current and the actual valve current is greater than that at at least one of the second setpoint valve current and the actual valve current, and
    the transfer cross section at at least one of the first setpoint valve current and the actual valve current is smaller than that at at least one of the second setpoint valve current and the actual valve current.

2. The method as recited in claim 1, wherein:
    the method is for an automatic transmission of a motor vehicle.

3. The method as recited in claim 1, further comprising:
    superimposing on the trigger signal a heterodyne signal having a smaller heterodyne frequency in comparison with the clock frequency.

4. The method as recited in claim 3, further comprising:
    altering at least one of a heterodyne frequency and an amplitude of the heterodyne signal by the control device as a function of the performance quantity.

5. The method as recited in claim 1, wherein:
the clock frequency is a function of a temperature of a working medium of the electromagnetic valve.

6. The method as recited in claim 5, wherein:
the clock frequency becomes higher with an increase in a temperature of the working medium.

7. The method as recited in claim 1, wherein:
the clock frequency is a function of a level of a power supply voltage of the electromagnetic valve.

8. The method as recited in claim 7, wherein:
the clock frequency becomes higher with an increase in the power supply voltage.

9. The method as recited in claim 1, wherein:
a load terminal of the electromagnetic valve is in operative connection to a load, and
the clock frequency is a function of an operating state of the load.

10. A method for controlling an electromagnetic valve, comprising:
triggering a coil of the electromagnetic valve by a control device with a pulse-width-modulated trigger signal; and
altering a clock frequency of the trigger signal by the control device as a function of a performance quantity of the electromagnetic valve; and
superimposing on the trigger signal a heterodyne signal having a smaller heterodyne frequency in comparison with the clock frequency.

11. The method as recited in claim 10, further comprising:
altering at least one of a heterodyne frequency and an amplitude of the heterodyne signal by the control device as a function of the performance quantity.

* * * * *